(12) United States Patent
Chen (10) Patent No.: US 12,508,686 B2
(45) Date of Patent: Dec. 30, 2025

(54) ELECTRIC TOOL GRINDING MACHINE

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

( * ) Notice: Subject to any disclaimer, the term of this patent is extended or adjusted under 35 U.S.C. 154(b) by 364 days.

(21) Appl. No.: 17/984,618

(22) Filed: Nov. 10, 2022

(65) Prior Publication Data

US 2024/0157507 A1    May 16, 2024

(51) Int. Cl.
| | |
|---|---|
| *B24B 47/26* | (2006.01) |
| *B24B 23/02* | (2006.01) |
| *B24B 47/12* | (2006.01) |
| *H02K 7/14* | (2006.01) |
| *H02K 9/06* | (2006.01) |

(52) U.S. Cl.
CPC .............. *B24B 47/26* (2013.01); *B24B 23/02* (2013.01); *B24B 47/12* (2013.01); *H02K 7/145* (2013.01); *H02K 9/06* (2013.01)

(58) Field of Classification Search
CPC ....... B24B 23/02; B24B 23/028; B24B 47/12; B24B 55/02; B24B 55/102; B24B 55/052; B24B 41/04; B24B 41/077; H02K 9/06; H02K 9/104; H02K 7/14; H02K 7/145; H02K 5/207; B25F 5/008
See application file for complete search history.

(56) References Cited

U.S. PATENT DOCUMENTS

| | | | | |
|---|---|---|---|---|
| 8,435,096 B2 * | 5/2013 | Chen | ...................... | B24B 41/007 |
| | | | | 451/7 |
| 2016/0193727 A1 * | 7/2016 | Takeda | ..................... | B25F 5/008 |
| | | | | 173/46 |

FOREIGN PATENT DOCUMENTS

| | | | | |
|---|---|---|---|---|
| CN | 212399150 U | * | 1/2021 | |
| EP | 2132000 B1 | | 4/2012 | |
| EP | 2946710 B1 | | 8/2017 | |
| WO | WO-2021065273 A1 | * | 4/2021 | .............. B25F 5/008 |

OTHER PUBLICATIONS

Machine translation of CN-212399150-U (Year: 2021).*
Machine translation of WO-2021065273-A1 (Year: 2021).*

* cited by examiner

*Primary Examiner* — Robert F Neibaur
(74) *Attorney, Agent, or Firm* — MUNCY, GEISSLER, OLDS & LOWE, P.C.

(57) ABSTRACT

An electric tool grinding machine has an electric motor, a grip body, a cover connected to the body, an eccentric block in the cover and driven by the motor, and an airflow generating member attaching on the block. The body has at least one air hole having a first distance relative to an axis of the motor, the cover doesn't have a through hole, the airflow generating member has a bottom plate and a plurality of fan blades, a second distance is between a top edge of the blade and the body, a third distance is between an outer edge of the blade and the cover, the second distance is at least 50% of a longitudinal length of the blade, the third distance is at least 50% of a radial length of the blade, and an outer diameter of the airflow generating member is greater than the first distance.

13 Claims, 11 Drawing Sheets

ELECTRIC TOOL GRINDING MACHINE

FIELD OF THE INVENTION

The invention relates to an electric tool grinding machine, and more particularly to an electric tool grinding machine capable of effectively discharging accumulated heat of a motor without being equipped with an active dust suction structure.

BACKGROUND OF THE INVENTION

Figure 1:
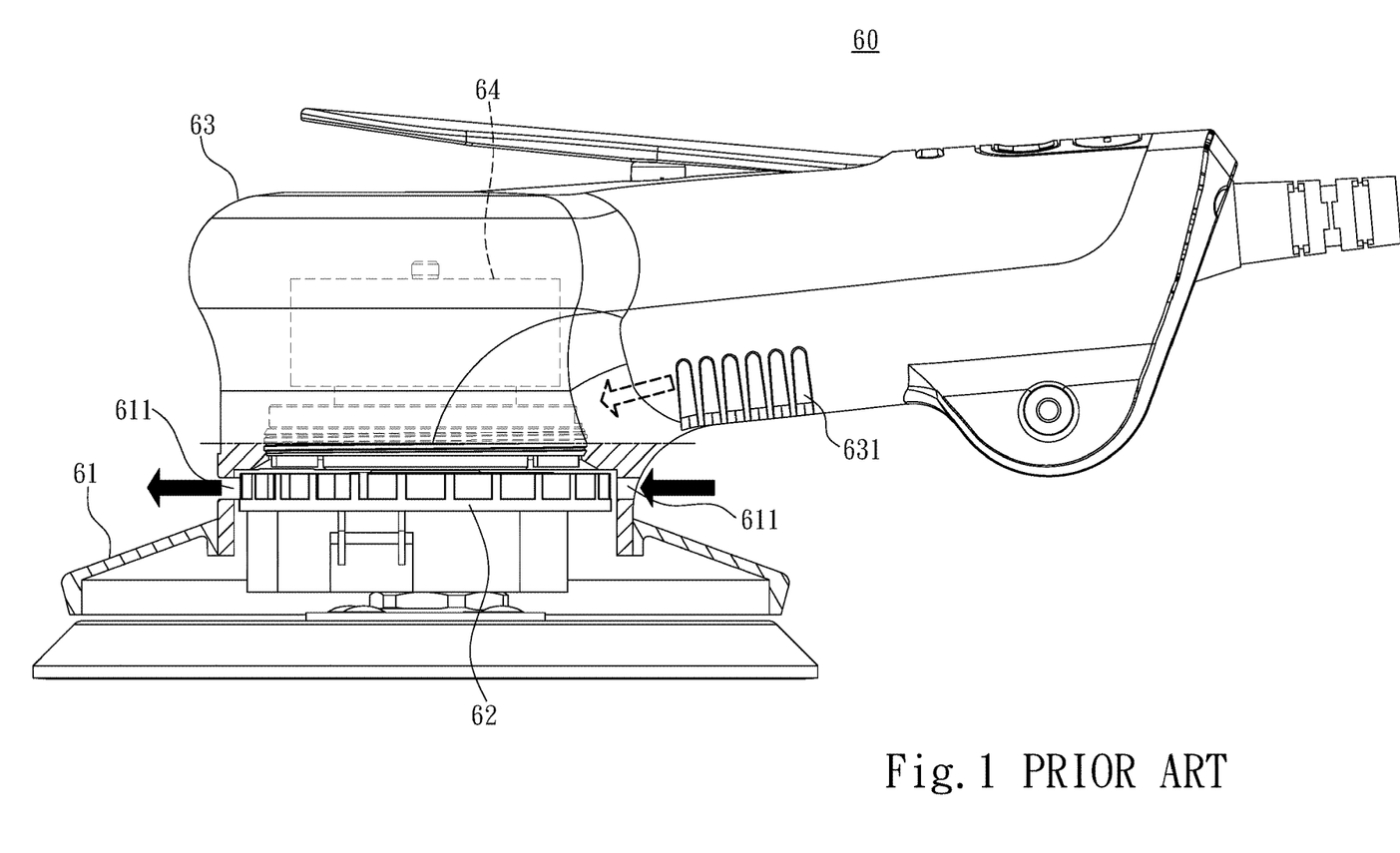
FIG. 1 is a first schematic diagram of a partial structure of a conventional electric tool grinding machine.
Figure 2:
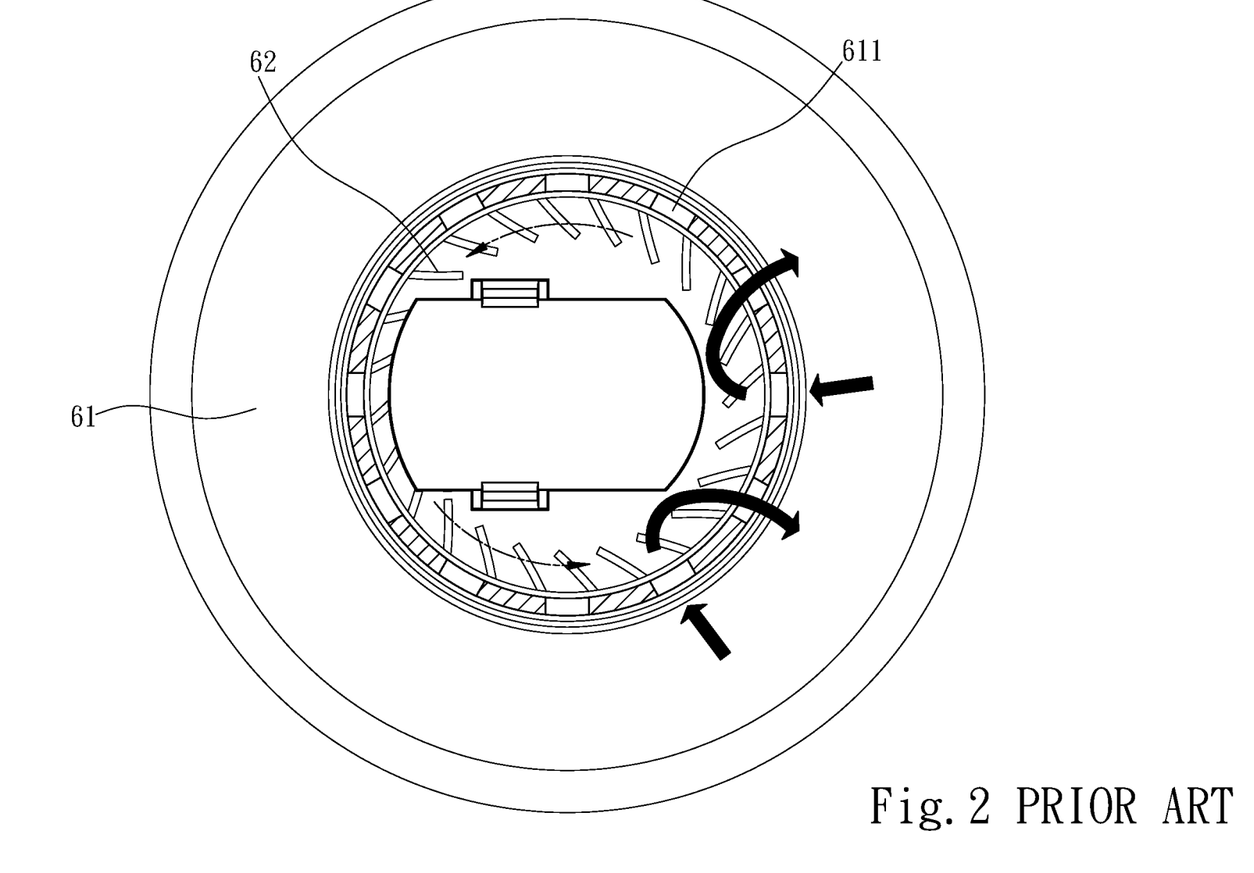
FIG. 2 is a schematic diagram of airflow of an airflow generating member of the conventional electric tool grinding machine.

An existing electric tool grinding machine is generally attached with an airflow generating member to an eccentric block to which the tool grinding machine belongs, so as to generate heat dissipation airflow through the airflow generating member, and discharge the waste heat generated by the electric tool grinding machine during operation. One such embodiment is as provided in European Patent No. EP2132000B1, or as depicted in FIG. 1. In the technical solution shown in FIG. 1, a grinding disc cover 61 of an electric tool grinding machine 60 is provided with through holes 611, an airflow generating member 62 is disposed close to the through holes 611, and at the same time close to a port of the grinding disc cover 61 connected to a grip body 63. Ideally, when the airflow generating member 62 rotates, the airflow generating member 62 introduces air through the through holes 611 for heat dissipation. However, because the through holes 611 are spaced apart from one another and the airflow generating member 62 is too close to the through holes 611, the through holes 611 cannot produce the expected effect in practice. When one of the through holes 611 intakes air, an adjacent one of the through holes 611 discharges air, resulting in a short flow problem (also known as short cycle), as shown in FIG. 2. As a result, air intake of the through holes 611 is not as efficient as expected, and the short flow problem further causes the heat dissipation effect of the airflow generating member 62 to be limited on the eccentric block. Although waste heat can be exhausted as the eccentric block is connected to an electric motor 64, a diameter of a shaft of the eccentric block connecting with the electric motor 64 is generally small, and the waste heat transfer speed is not as fast as a speed of the heat generated by the electric motor 64 itself, resulting in continuous accumulation of waste heat, which affects the user's feeling when holding and using the electric tool grinding machine 60.

Furthermore, although some embodiments are implemented with a plurality of air inlet holes 631 on the grip body 63, the outside air is sucked in through the plurality of air inlet holes 631 by rotation of the airflow generating member 62 to form a heat dissipation airflow, based on the aforementioned structures, it can be known that the airflow generating member 62 has the problem of poor air intake efficiency and cannot generate suction that meets the requirements. Although the heat dissipation airflow passes through the electric motor 64, the wind volume of the airflow generating member 62 is insufficient to dissipate heat from the electric motor 64, and therefore the problem of waste heat accumulation of the electric motor 64 is still serious.

Figure 3:
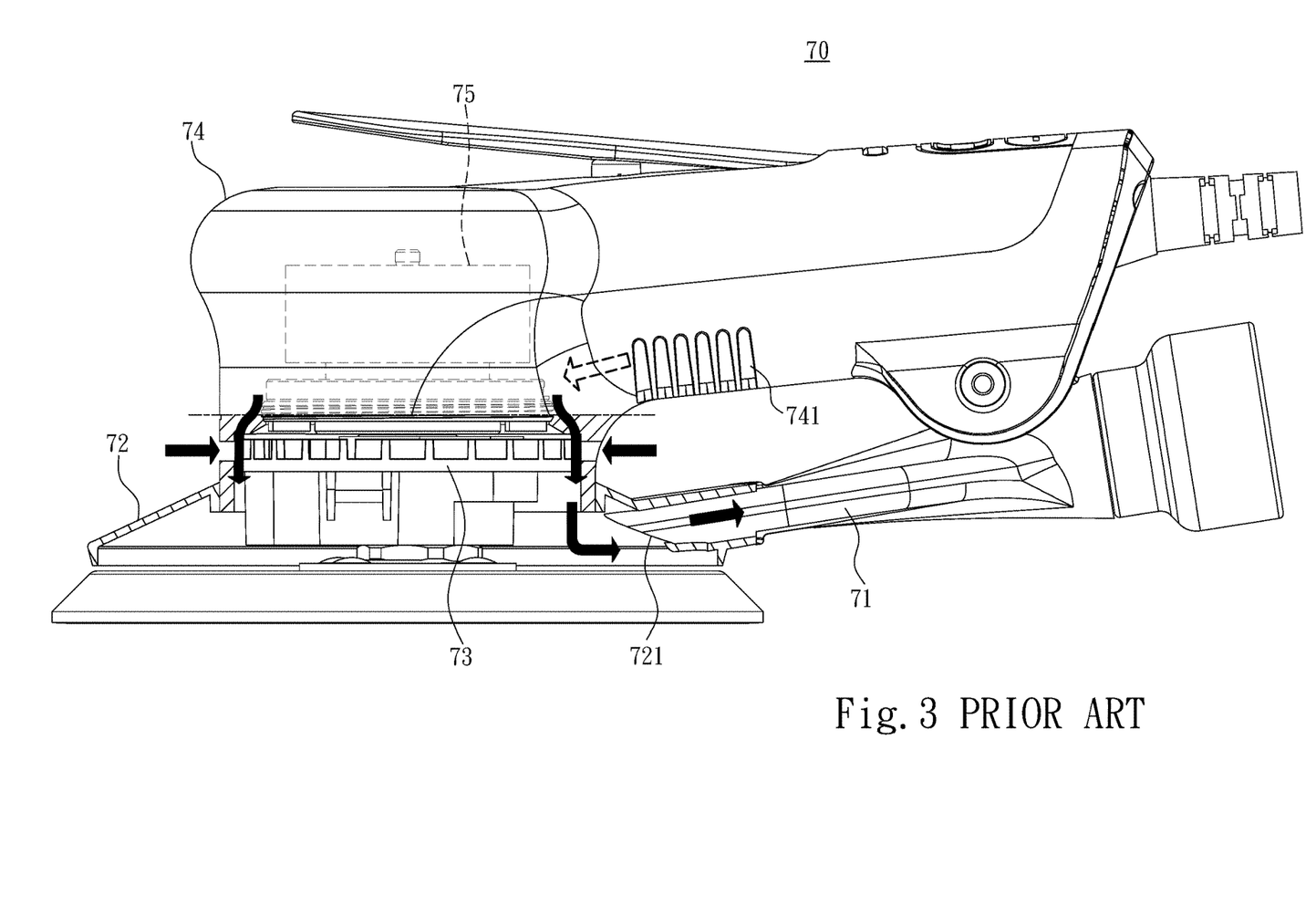
FIG. 3 is a second schematic diagram of a partial structure of the conventional electric tool grinding machine.

Currently, the only solution that can solve the aforementioned problems is to implement an active dust suction structure 71 on an electric tool grinding machine 70, as shown in FIG. 3 or European Patent No. EP2946710B1. As shown in FIG. 3, an air inlet of the active dust suction structure 71 is a suction port 721 formed on a grinding disc cover 72. During implementation, the active dust suction structure 71 generates suction in a space in the grinding disc cover 72, the aforementioned suction is obviously greater than the suction generated by a airflow generating member 73, and also a large amount of air sucked in through a plurality of air inlets 741 on a grip body 74 contributes greatly to heat dissipation of an electric motor 75.

However, not all electric tool grinding machines can be equipped with the active dust suction structure, and therefore there is still a need for a solution to solve heat accumulation of the electric motor when the electric tool grinding machine is not equipped with the active dust suction structure.

SUMMARY OF THE INVENTION

A main object of the invention is to solve the problem that the accumulated heat converted from electricity is not easy to discharge when conventional electric tool grinding machine is not equipped with an active dust suction structure.

A secondary object of the invention is to solve the problem that the design of the airflow generating member and the corresponding structures of conventional electric tool grinding machine make the heat dissipation airflow inefficient.

In order to achieve the above-mentioned objects, the invention provides an electric tool grinding machine, including an electric motor, a grip body provided for disposing the electric motor, a cover connected to the grip body, an eccentric block located in the cover and driven by the electric motor, and an airflow generating member attaching on the eccentric block. The grip body includes at least one air hole, a first distance is defined between the at least one air hole and an axis of the electric motor, the cover is devoid of a through hole, and the airflow generating member includes a bottom plate and a plurality of fan blades arranged at intervals in a circle on a same side of the bottom plate, and wherein a second distance is defined between a top edge of each of the plurality of fan blades and the grip body, and a third distance is defined between an outer edge of each of the plurality of fan blades and the cover, the second distance is at least 50% of a longitudinal length of each of the plurality of fan blades, the third distance is at least 50% of a radial length of each of the plurality of fan blades, and wherein an outer diameter of the airflow generating member is greater than the first distance.

In one embodiment, the eccentric block includes a first part connected to the electric motor, and a second part connected to the first part, an axis of the second part is offset from an axis of the first part, and the airflow generating member is attached to the second part.

In one embodiment, a horizontal level of a bottom edge of the airflow generating member is consistent with a horizontal level of a bottom edge of the eccentric block.

In one embodiment, the airflow generating member includes an opening formed on the bottom plate, and at least two hooks formed on an edge of the opening.

In one embodiment, a side of the bottom plate facing a grinding disc is devoid of the plurality of fan blades.

In one embodiment, the cover is gradually expanded away from the airflow generating member from the top edge of each of the plurality of fan blades toward a bottom edge of each of the plurality of fan blades, a fourth distance is defined between an outer bottom edge of the airflow generating member and the cover, and the fourth distance is greater than the radial length of each of the plurality of fan blades.

In one embodiment, the cover includes an inclined surface located on an inner side and facing the plurality of fan blades, and wherein a horizontal level of a top end of the inclined surface is same as or higher than a horizontal level of the top edge of each of the plurality of fan blades.

In one embodiment, the grip body includes a skirt assembled with the cover, and an inner edge of the skirt is not a flat and straight surface.

In one embodiment, the at least one air hole is arcuate.

In one embodiment, the at least one air hole is disposed along an edge of a motor housing provided in the grip body.

In one embodiment, the electric tool grinding machine includes a plurality of air holes, and the plurality of air holes each have a same shape and are disposed at intervals.

Through the above-mentioned implementation of the invention, compared with conventional technique, the invention has the following features: the cover of the electric tool grinding machine of the invention does not need to open any of the through hole that intake air from a side of the cover. A space formed between the airflow generating member and the grip body and an inner circle area of the airflow generating member enable an airflow exhausted from the air hole to flow therein for a short time. Next, the airflow is smoothly guided by the airflow generating member to discharge between the cover and the grinding disc. Disposition of the airflow generating member of the invention enables the electric tool grinding machine to be capable of greatly improving the heat accumulation problem of the electric motor existing in the conventional design without excessively modifying the basic design of the electric tool grinding machine and without installing an active dust suction structure, which greatly increases the comfort of a user's palm when holding and using the electric tool grinding machine for a long time.

DETAILED DESCRIPTION OF THE PREFERRED EMBODIMENTS

The detailed description and technical content of the invention are described below with reference to the accompanying drawings.

Figure 4:
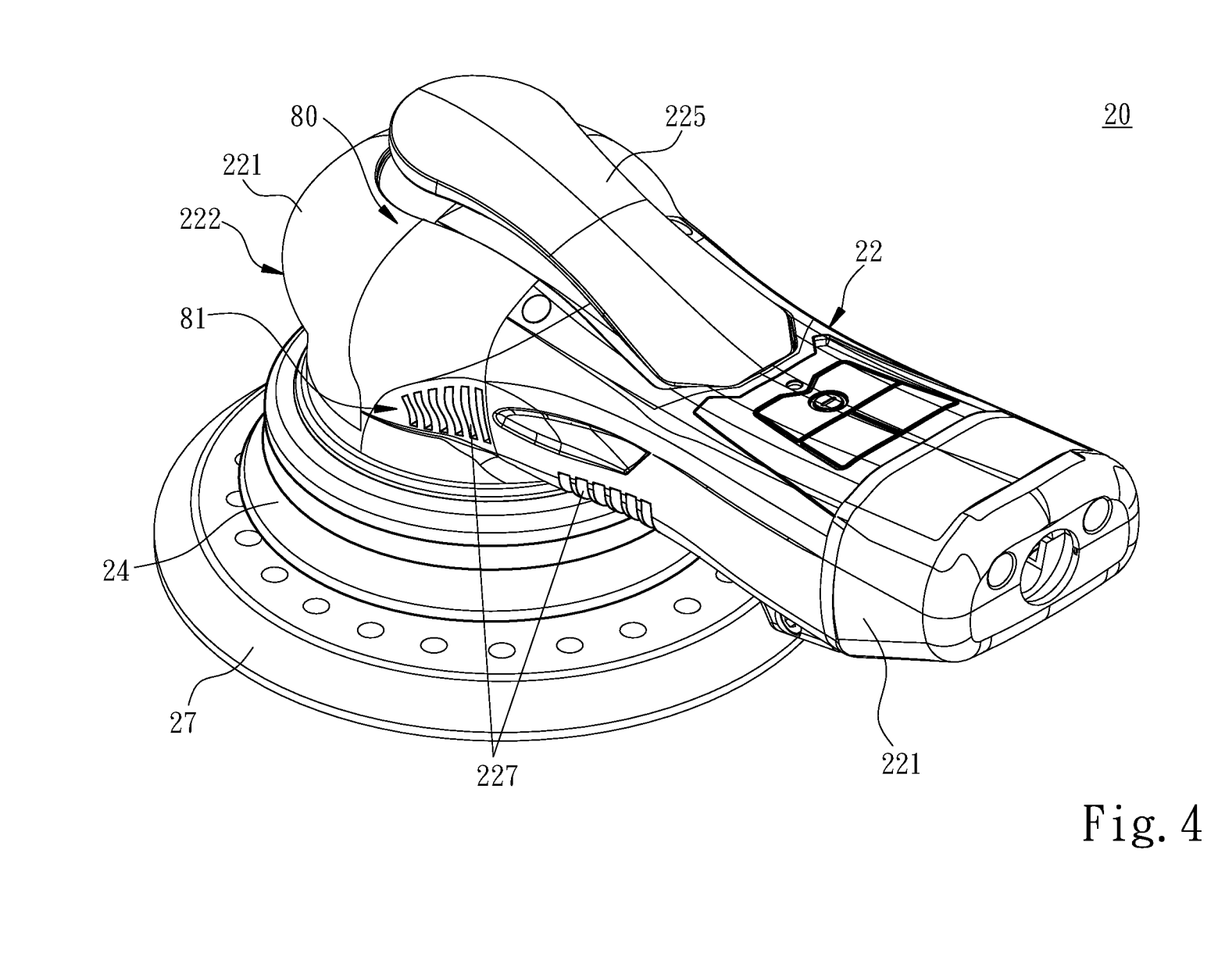
FIG. 4 is a perspective view of an overall appearance of an electric tool grinding machine of the invention.
Figure 5:
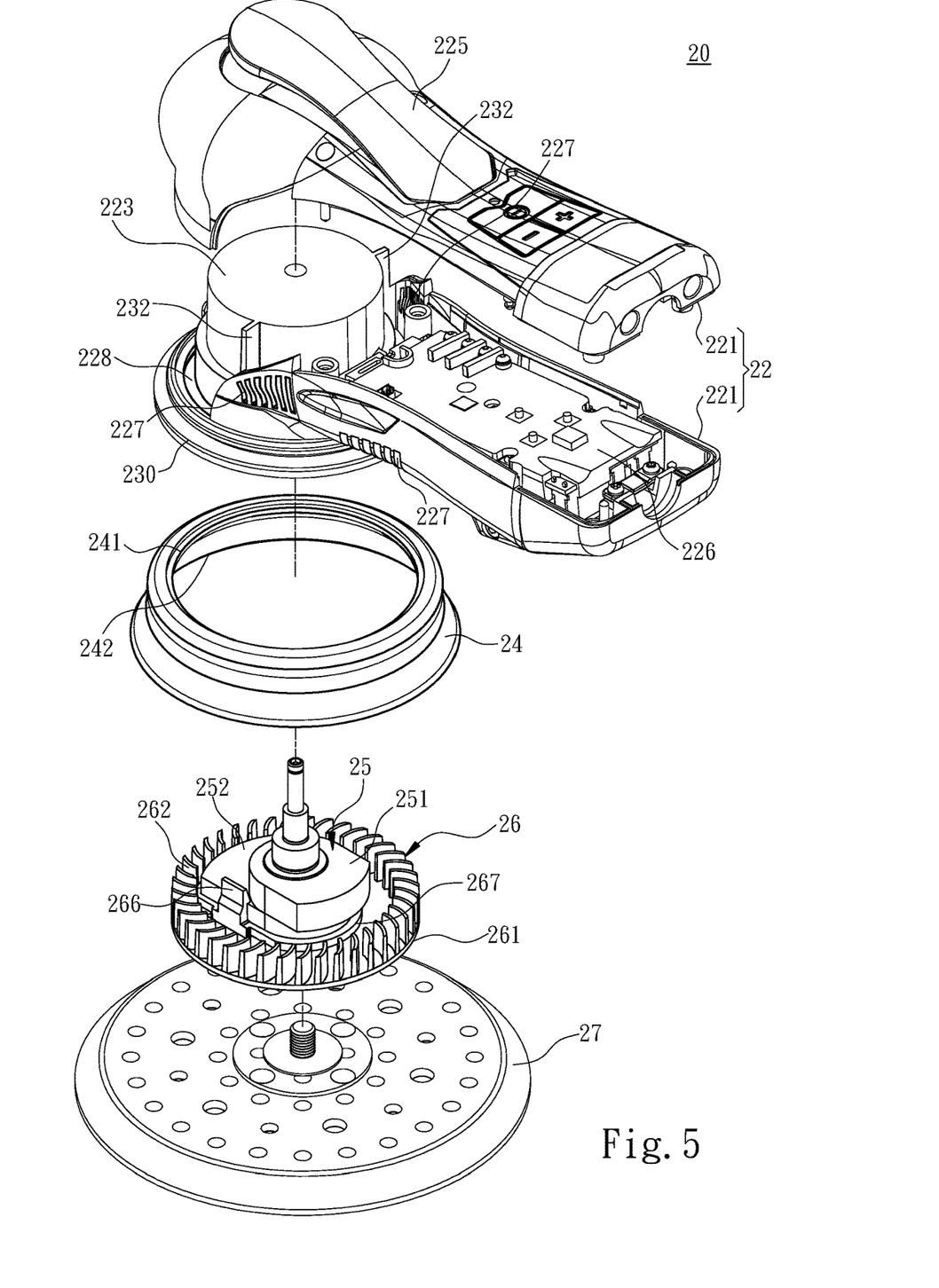
FIG. 5 is a exploded perspective view of the electric tool grinding machine of the invention.
Figure 6:
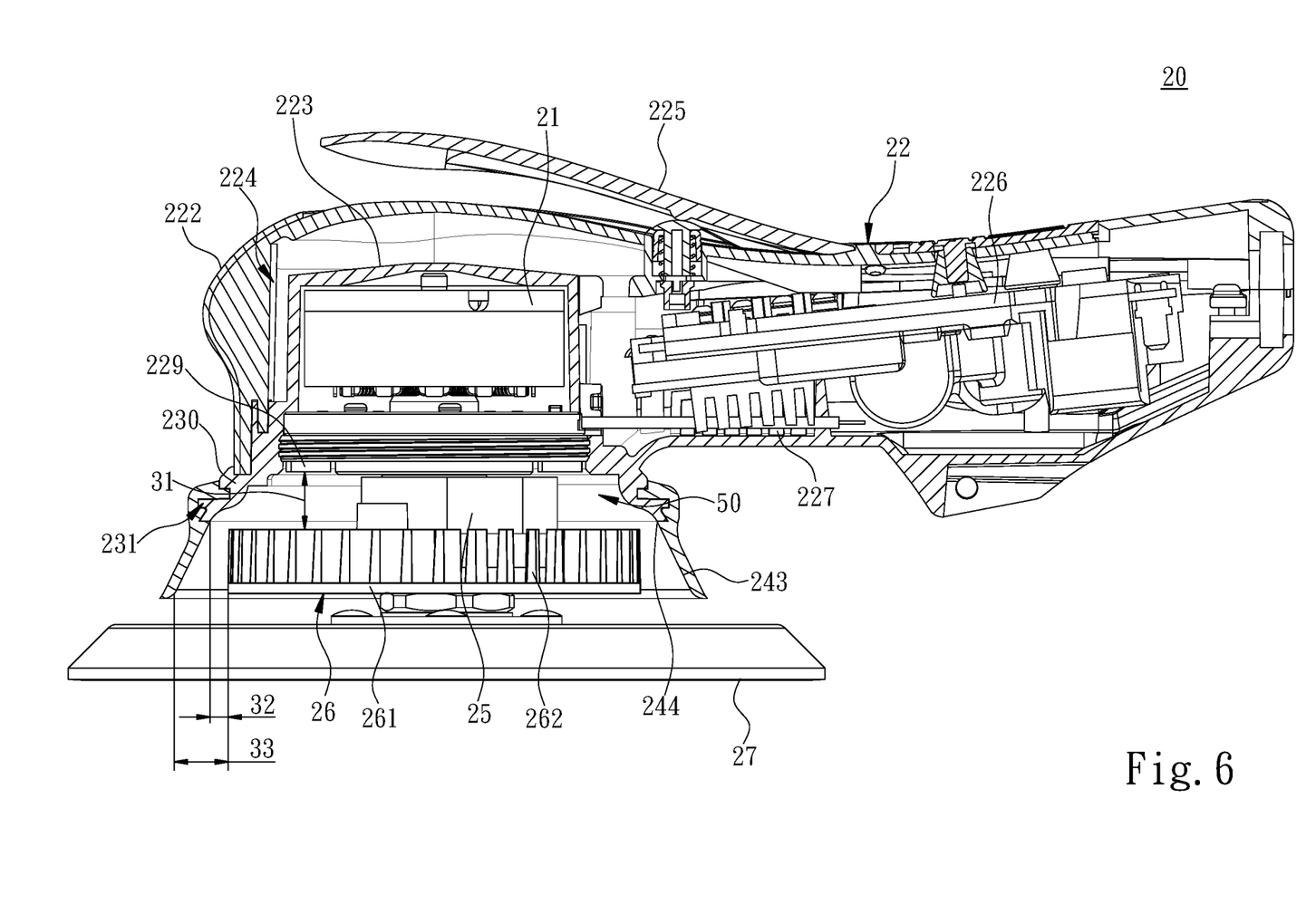
FIG. 6 is a cross-sectional view of the electric tool grinding machine of the invention.

Please refer to FIGS. 4, 5, and 6, the invention provides an electric tool grinding machine 20, the electric tool grinding machine 20 comprises an electric motor 21, a grip body 22 for disposing the electric motor 21, a cover 24 connected to the grip body 22, an eccentric block 25 located in the cover 24 and driven by the electric motor 21, and an airflow generating member 26 attaching on the eccentric block 25. The electric motor 21 is an internal rotor motor or an external rotor motor. The grip body 22 is composed of shells 221, one of the shells 221 is a part of a casing 222. In addition to being a part of the casing 222, one of the shells 221 is also form a motor housing 223. The motor housing 223 is located in space defined by the shells 221 when the shells 221 are assembled, that is, the motor housing 223 is located in the grip body 22. The invention uses a space between the motor housing 223 and the casing 222 as a channel 224 that allows air to flow. The electric motor 21 is disposed in the grip body 22. In addition, an operating plate 225 and a control module 226 that cooperates with the operating plate 225 are also disposed in the grip body 22. The grip body 22 is further provided with a plurality of air intake holes 227, and the plurality of air intake holes 227 introduce external air when the airflow generating member 26 is turned on. In one embodiment, at least one of the plurality of air intake holes 227 is disposed corresponding to the control module 226. In addition, the cover 24 includes an assembly port 241 and a release port 242 opposite to the assembly port 241. The assembly port 241 assembles with the grip body 22. The release port 242 remains open when the cover 24 is assembled. The release port 242 faces a grinding disc 27 arranged with the eccentric block 25.

Figure 7:
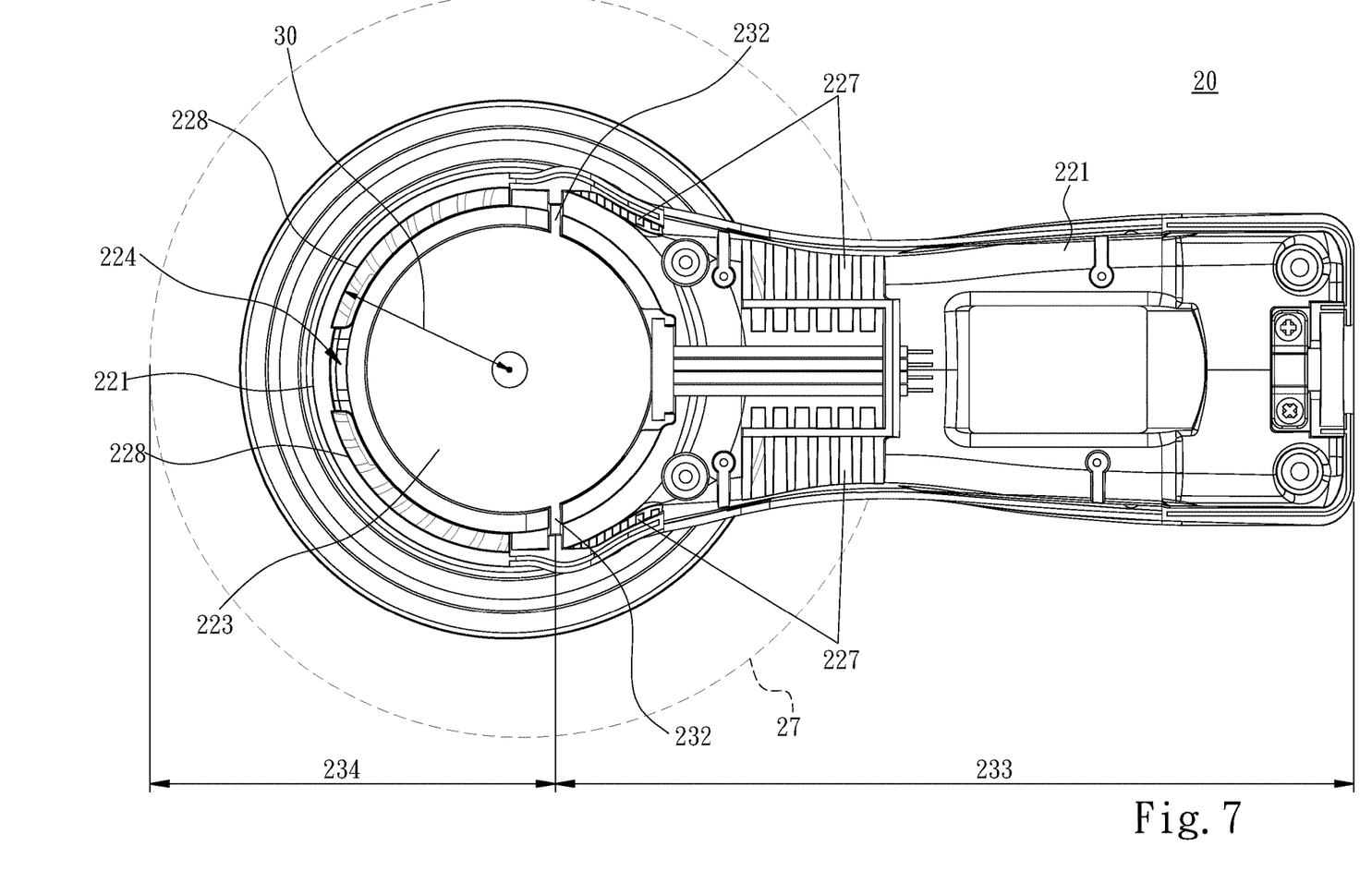
FIG. 7 is a top view of a partial structure of the electric tool grinding machine of the invention.

Please refer to FIG. 7, the grip body 22 of the invention includes at least one air hole 228. The at least one air hole 228 enables the grip body 22 communicate with an inner space of the cover 24 and is located in the channel 224. Please refer to FIG. 6 and FIG. 8, the cover 24 of the invention is devoid of a through hole. Specifically, the release port 242 is the only part of the cover 24 that enables airflow to pass through. The airflow generating member 26 of the invention includes a bottom plate 261 and a plurality of fan blades 262 disposed on the bottom plate 261. Each of the plurality of fan blades 262 has a same posture. The plurality of fan blades 262 are not connected to one another. The plurality of fan blades 262 are disposed on a same side of the bottom plate 261 at intervals. The plurality of fan blades 262 are arranged in a circle on the bottom plate 261. Further, please refer to FIG. 8, the plurality of fan blades 262 are disposed along an edge of the bottom plate 261. When observing from a top view angle of the airflow generating member 26, the airflow generating member 26 is defined by divided into an inner ring 263 not provided with the plurality of fan blades 262, and an outer ring 264 provided with the plurality of fan blades 262. Please refer to FIG. 6 and FIG. 7, a first distance 30 is defined between the at least one air hole 228 and an axis of the electric motor 21. A second distance 31 is defined between a top edge of each of the plurality of fan blades 262 and the grip body 22. A third distance 32 is defined between an outer edge of each of the plurality of fan blades 262 and the cover 24. More specifically, the second distance 31 refers to a distance from each of the plurality of fan blades 262 to a connecting plate 229 of the grip body 22 facing the cover 24. Further, an outer diameter of the airflow generating member 26 is greater than the first distance 30. The second distance 31 is at least 50% of a longitudinal length of each of the plurality of fan blades 262. The third distance 32 is at least 50% of a radial length of each of the plurality of fan blades 262.

Figure 9:
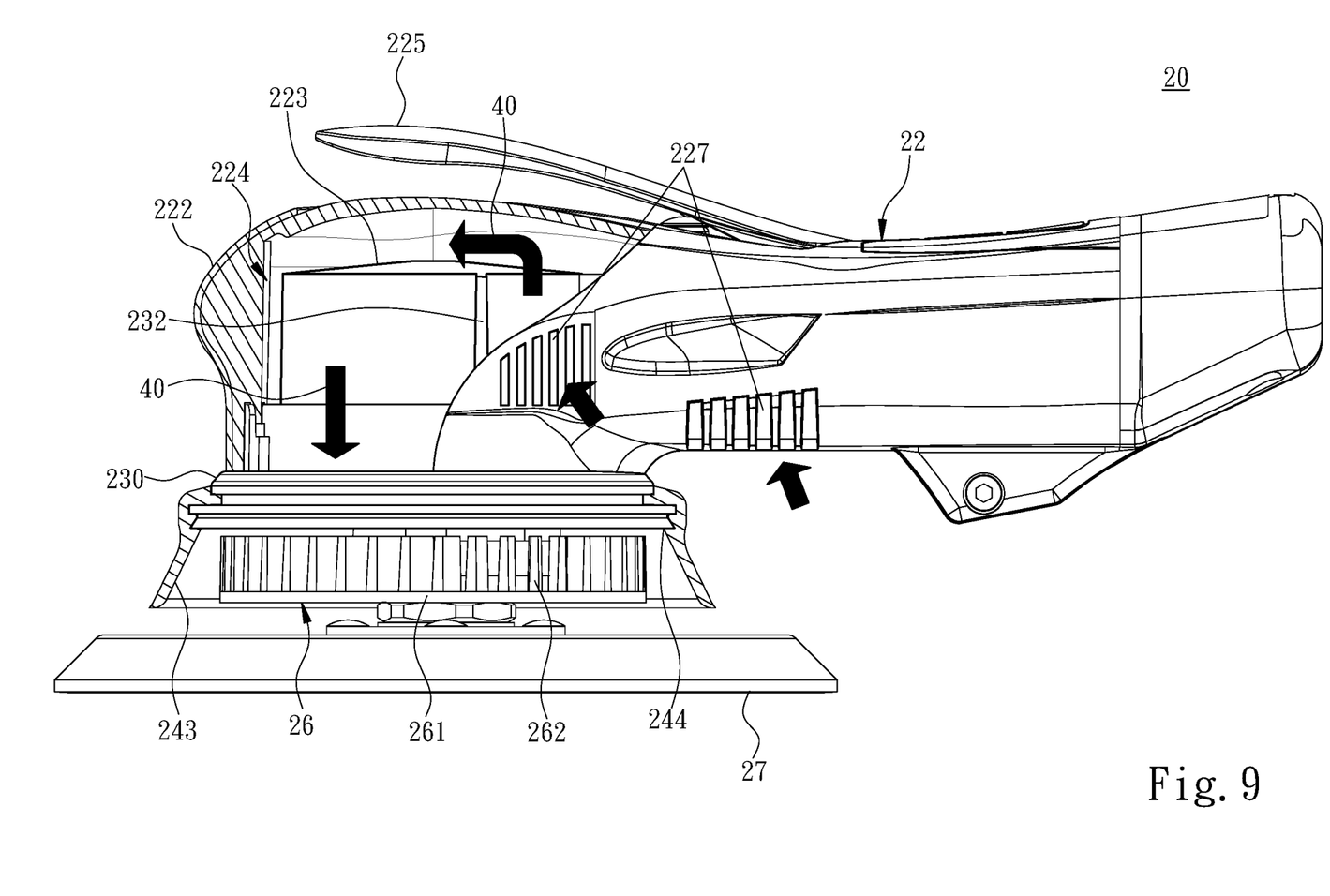
FIG. 9 is a first schematic diagram of internal heat dissipation airflow of the electric tool grinding machine of the invention.
Figure 10:
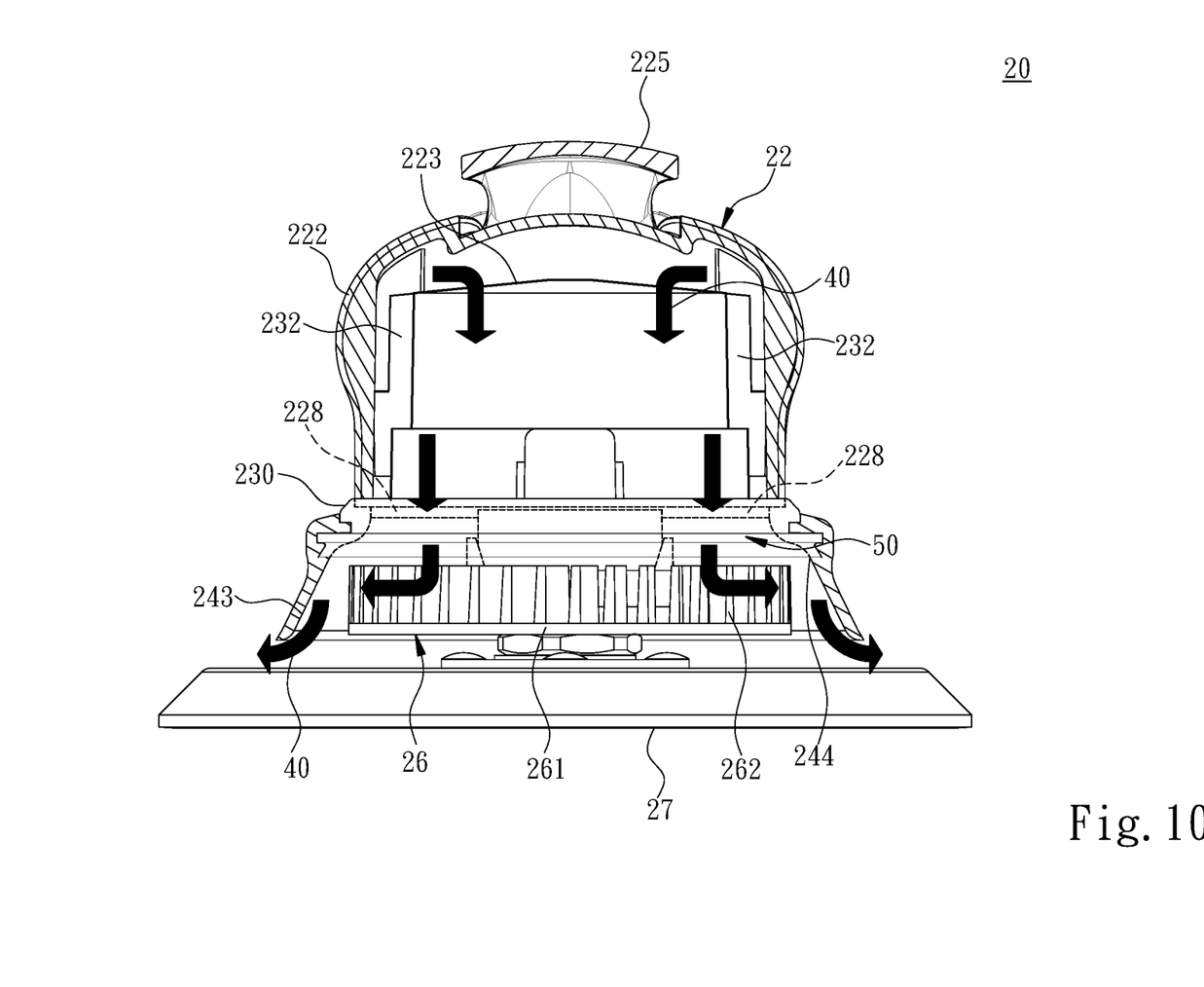
FIG. 10 is a second schematic diagram of internal heat dissipation airflow of the electric tool grinding machine of the invention.

Please refer to FIG. 9, the airflow generating member 26 of the invention rotates with the eccentric block 25. When the airflow generating member 26 rotates, at least one heat dissipation airflow 40 is generated in the electric tool grinding machine 20. The at least one heat dissipation airflow 40 flows from the plurality of air intake holes 227 and passes through the channel 224 to dissipate heat of the electric motor 21, and passes through the at least one air hole 228 and the airflow generating member 26 sequentially (as shown in FIG. 10), and then the at least one heat dissipation airflow 40 is discharged from the release port 242 of the cover 24. Please refer to FIG. 10, through the aforementioned structure of the invention, when the at least one heat dissipation airflow 40 passes through the at least one air hole 228, the at least one heat dissipation airflow 40 first enters a space between the airflow generating member 26 and the grip body 22 and a range of the inner ring 263 of the airflow generating member 26, and is then guided and discharged by the plurality of fan blades 262. The space provided between the airflow generating member 26 and the grip body 22 and the range of the inner ring 263 of the airflow generating member 26 are referred to as an airflow temporary storage area 50, and the airflow temporary storage area 50 enables the heat dissipation airflow 40 to be smoothly guided, so that the electric tool grinding machine 20 of the invention is capable of generating a large airflow in the grip body 22 for heat dissipation without mounting an active dust suction structure, specifically improving the problem that accumulated heat of the electric motor 21 is not easy to be discharged, and greatly increasing the comfort of a user's palm when holding and using the electric tool grinding machine 20 for a long time. Please refer to Table 1 and Table 2. Table 1 is a comparison table of temperature rise between the invention and the conventional technique. Specifically, "the invention" refers to the electric tool grinding machine 20 of the invention, "convention without suction" refers to a conventional electric tool grinding machine not equipped with an active dust suction structure and equipped with a cover with through holes, and "convention with suction" a conventional electric tool grinding machine equipped with an active dust suction structure. A temperature measurement point of Table 1 (indicated as 80 in FIG. 4) is the palm position when the user is grasping the electric tool grinding machine with 80 grit abrasive paper (#80) and 6 inches overall diameter grinding disc at a load of 180 watts (W). Basic conditions of Table 2 are the same as those of Table 1, the only difference is that the temperature measurement point of Table 2 is the user's finger grip position (indicated as 81 in FIG. 4).

TABLE 1

|  | Ambient temperature | Machine running time | | | | |
|---|---|---|---|---|---|---|
|  |  | 10 minutes | 15 minutes | 20 minutes | 25 minutes | 30 minutes |
| The invention | 22.3 | 28.8 | 30.9 | 31.7 | 31.8 | 31.7 |
| Convention without suction | 22.8 | 37.4 | 43.3 | 48.1 | 51.9 | 53.1 |
| Convention with suction | 21.8 | 31.9 | 31.4 | 32.3 | 31.0 | 32.0 |

TABLE 2

|  | Ambient temperature | Machine running time | | | | |
|---|---|---|---|---|---|---|
|  |  | 10 minutes | 15 minutes | 20 minutes | 25 minutes | 30 minutes |
| The invention | 22.3 | 24.8 | 25.2 | 24.9 | 24.4 | 24.3 |
| Convention without suction | 22.8 | 45.1 | 51.8 | 54.7 | 62.3 | 61.1 |
| Convention with suction | 21.8 | 27.9 | 28.9 | 28.1 | 29.2 | 28.9 |

As indicated in Table 1 and Table 2, it can be understood unambiguously that when the conventional technique without dust suction continues to operate for 15 minutes, the temperatures of the palm measurement point and the finger grip measurement point increase significantly. With the high temperatures at the palm measurement point and the finger grip measurement point located on a surface of the electric tool grinding machine, it is obvious that a temperature caused by waste heat accumulation of electric motor inside electric tool grinding machine will be higher, which highlights the problems of electric motor heat accumulation and the conventional airflow generating member being incapable of functioning properly as mentioned previously. Comparing the temperatures of the invention and the conventional technique with dust suction during the different operation times of the electric tool grinding machine, in addition to the temperatures of the palm measurement point of the invention without the active dust suction structure are on par with the temperatures of the conventional technique with dust suction, performance of the invention without the active dust suction structure produced at the finger grip measurement point (Table 2) is significantly better than that of the conventional technique with dust suction. Accordingly, the invention does improve the problem of heat accumulation of the electric motor that the conventional technique is incapable of solving.

Figure 11:
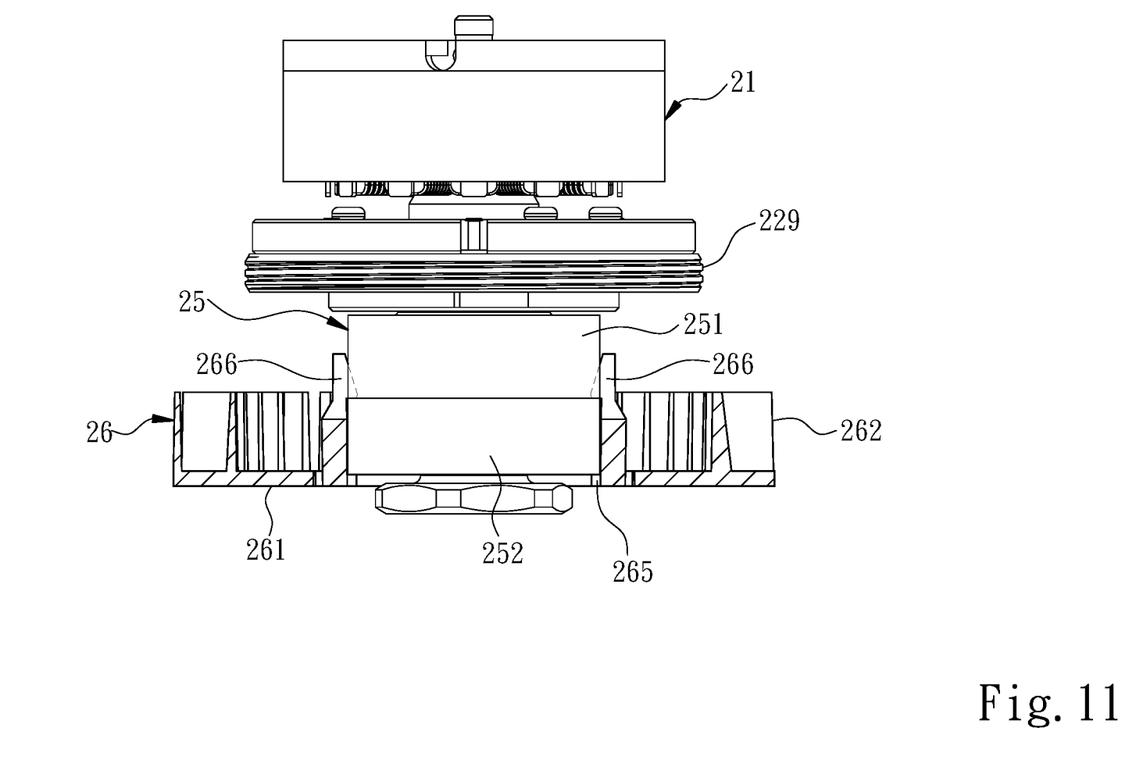
FIG. 11 is a schematic view of the airflow generating member of the invention attached to an eccentric block.

Please refer to FIG. 11, in one embodiment, the eccentric block 25 includes a first part 251 connected to the electric motor 21, and a second part 252 connected to the first part 251, an axis of second part 252 is offset from an axis of the first part 251, and the airflow generating member 26 is attached to the second part 252. In one embodiment, a horizontal level of a bottom edge of the airflow generating member 26 is consistent with a horizontal level of a bottom edge of the eccentric block 25.

Figure 8:
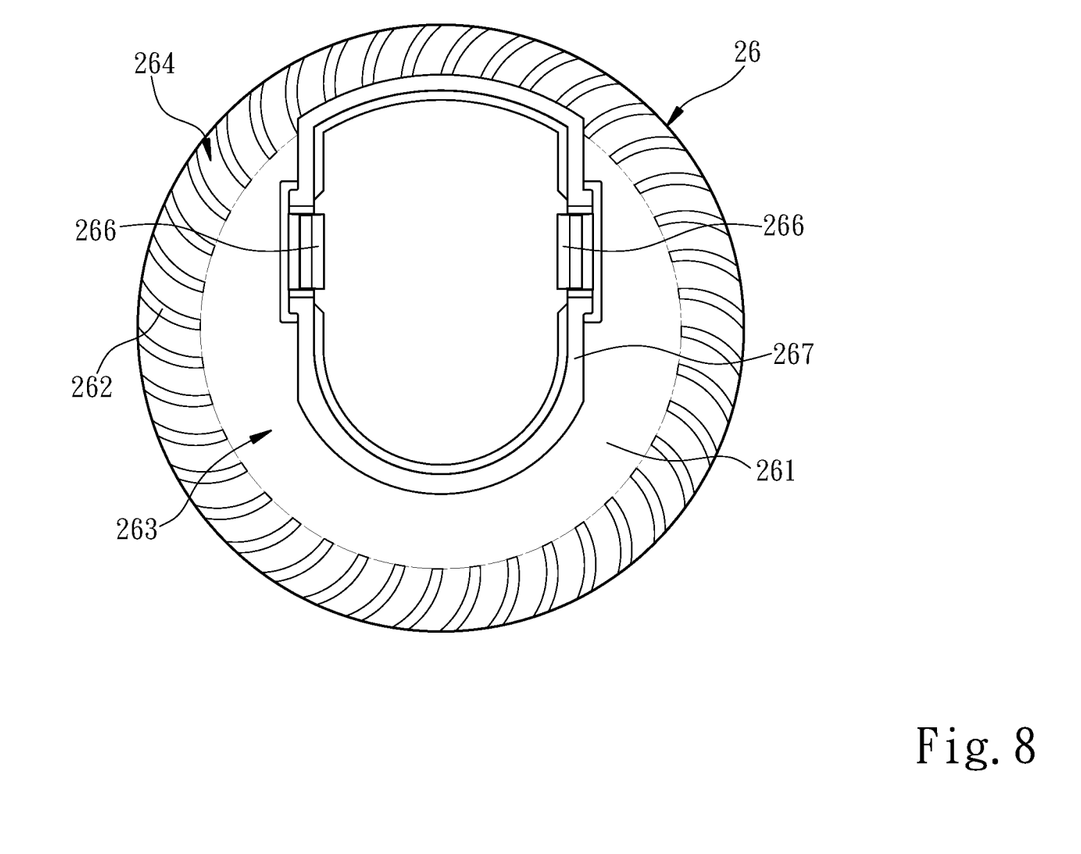
FIG. 8 is a top view of an airflow generating member of the invention.

Please refer to FIG. 8 and FIG. 11, in one embodiment, the airflow generating member 26 includes an opening 265 formed on the bottom plate 261, and at least two hooks 266 formed on an edge of the opening 265. The at least two hooks 266 are disposed opposite to each other so as to be fixed with the eccentric block 25. In addition, the airflow generating member 26 further has a surrounding wall 267 disposed around the opening 265. In one embodiment, the plurality of fan blades 262 are not disposed on a side of the bottom plate 261 facing the grinding disc 27. That is to say, the airflow generating member 26 does not have any of the plurality of fan blades 262 on the side of the bottom plate 261 facing the grinding disc 27, and the side of the bottom plate 261 facing the grinding disc 27 is devoid of the plurality of fan blades 262.

Please refer to FIG. 6, in one embodiment, the cover 24 is gradually expanded away from the airflow generating member 26 from the top edge of each of the plurality of fan blades 262 toward a bottom edge of each of the plurality of fan blades 262, that is, the cover 24 is trumpet-shaped. In addition, a fourth distance 33 is defined between an outer bottom edge of the airflow generating member 26 and the cover 24. The fourth distance 33 is greater than the radial length of each of the plurality of fan blades 262. In one embodiment, the cover 24 includes an inclined surface 243 located on an inner side and facing the plurality of fan blades 262. A horizontal level of a top end of the inclined surface 243 (marked as 244 in the figure) is same as higher than a horizontal level of the top edge of each of the plurality of fan blades 262.

Please refer to FIG. 5 and FIG. 6. In one embodiment, the grip body 22 includes a skirt 230 assembled with the cover 24. Surface of the skirt 230 is formed with a continuous concave-convex structure 231. The continuous concave-convex structure 231 provides the assembly port 241 of the cover 24 to be sleeved thereon. Further, an inner edge of the skirt 230 is not a flat and straight surface. The inner edge of the skirt 230 is a continuous arcuate surface. The inner edge of the skirt 230 and an inner edge of the cover 24 further forms a continuous surface jointly.

Please refer to FIG. 7. In one embodiment, the at least one air hole 228 is arcuate when observing from a top view angle. The at least one air hole 228 is disposed along an edge of the motor housing 223. Further, when the electric tool grinding machine 20 includes a plurality of air holes 228, the plurality of air holes 228 each have a same shape and are disposed at intervals. In one embodiment, the motor housing 223 is formed with two baffles 232 that form on two opposite sides of the motor housing 223, and the two baffles 232 are located in the channel 224. The two baffles 232 force the heat dissipation airflow 40 to be guided to top of the motor housing 223 (as shown in FIG. 9), and then flow toward the at least one air hole 228 (as shown in FIG. 10), thereby lowering a temperature rise of a part of the grip body 22 that is hold by the user's palm. Furthermore, if the two baffles 232 are used to distinguish an inner space of the grip body 22, it is divided into a tail section 233 where the control module 226 is provided, and a head section 234. In this embodiment, the plurality of air intake hole 227 provided on the grip body 22 is located in the tail section area 233, and the plurality of air intake holes 227 are distributed in the tail section area 233. For example, one of the plurality of air intake holes 227 faces the control module 226, and others of the plurality of air intake holes 227 directly face the motor housing 223.

What is claimed is:

1. An electric tool grinding machine, comprising an electric motor, a grip body provided for disposing the electric motor, a cover connected to the grip body, an eccentric block located in the cover and driven by the electric motor, and an airflow generating member attached on the eccentric block, the grip body comprising at least one air intake hole and a channel between the grip body and the electric motor, and the cover comprising a release port facing a grinding disc, wherein the electric tool grinding machine is characterized in that: the grip body comprises at least one air hole, the at least one air hole communicates the grip body and the cover, a first distance is defined between the at least one air hole and an axis of the electric motor, the cover is devoid of a through hole, and the airflow generating member comprises a bottom plate and a plurality of fan blades arranged at intervals in a circle on a side of the bottom plate, and wherein a second distance is defined between a top edge of each of the plurality of fan blades facing the electric motor and the grip body, and a third distance is defined between an outer edge of each of the plurality of fan blades and the cover, the second distance is at least 50% of a longitudinal length of each of the plurality of fan blades, the third distance is at least 50% of a radial length of each of the plurality of fan blades, and wherein an outer diameter of the airflow generating member is greater than the first distance, wherein the airflow generating member is configured to, when rotates, generate a heat dissipation airflow in the electric tool grinding machine, wherein the heat dissipation airflow flows from the at least one air intake hole and passes through the channel to dissipate heat of the electric motor, and passes through the at least one air hole and the airflow generating member sequentially, and then the heat dissipation airflow is discharged from the release port of the cover.

2. The electric tool grinding machine as claimed in claim 1, wherein the eccentric block comprises a first part connected to the electric motor, and a second part connected to the first part, an axis of the second part is offset from an axis of the first part, and the airflow generating member is attached to the second part.

3. The electric tool grinding machine as claimed in claim 1, wherein a horizontal level of a bottom edge of the airflow generating member is consistent with a horizontal level of a bottom edge of the eccentric block.

4. The electric tool grinding machine as claimed in claim 3, wherein the airflow generating member comprises an opening formed on the bottom plate, and at least two hooks formed on an edge of the opening.

5. The electric tool grinding machine as claimed in claim 4, wherein a side of the bottom plate facing a grinding disc is devoid of the plurality of fan blades.

6. The electric tool grinding machine as claimed in claim 1, wherein the cover is gradually expanded away from the airflow generating member from the top edge of each of the plurality of fan blades toward a bottom edge of each of the plurality of fan blades, a fourth distance is defined between an outer bottom edge of the airflow generating member and the cover, and the fourth distance is greater than the radial length of each of the plurality of fan blades.

7. The electric tool grinding machine as claimed in claim 6, wherein the cover comprises an inclined surface located on an inner side and facing the plurality of fan blades, and wherein a horizontal level of a top end of the inclined surface is same as or higher than a horizontal level of the top edge of each of the plurality of fan blades.

8. The electric tool grinding machine as claimed in claim 1, wherein the grip body comprises a skirt assembled with the cover, and an inner edge of the skirt is not a flat and straight surface.

9. The electric tool grinding machine as claimed in claim 8, wherein the cover is gradually expanded away from the airflow generating member from the top edge of each of the plurality of fan blades toward a bottom edge of each of the plurality of fan blades, a fourth distance is provided between an outer bottom edge of the airflow generating member and the cover, and the fourth distance is greater than the radial length of each of the plurality of fan blades.

10. The electric tool grinding machine as claimed in claim 8, wherein the cover comprises an inclined surface located on an inner side and facing the plurality of fan blades, and wherein a horizontal level of a top end of the inclined surface is at a same or a higher horizontal level of the top edge of each of the plurality of fan blades.

11. The electric tool grinding machine as claimed in claim 1, wherein the at least one air hole is arcuate.

12. The electric tool grinding machine as claimed in claim 11, wherein the at least one air hole is disposed along an edge of a motor housing provided in the grip body.

13. The electric tool grinding machine as claimed in claim 12, wherein the electric tool grinding machine comprises a plurality of air holes, and the plurality of air holes each have a same shape and are disposed at intervals.

\* \* \* \* \*